United States Patent [19]

Nussbaumer et al.

[11] Patent Number: 4,788,886
[45] Date of Patent: Dec. 6, 1988

[54] PLANETARY TRANSMISSION FOR TWO AXLES OF A MOTOR VEHICLE

[75] Inventors: Erwin Nussbaumer, Waiblingen; Rainer Gross, Stuttgart; Herbert Botzelmann, Remshalden; Hans Haller, Hattenhofen; Franz Buchwald, Lauffen, all of Fed. Rep. of Germany

[73] Assignee: Daimler-Benz Aktiengesellschaft, Stuttgart, Fed. Rep. of Germany

[21] Appl. No.: 3,388

[22] Filed: Jan. 15, 1987

[30] Foreign Application Priority Data

Jan. 15, 1986 [DE] Fed. Rep. of Germany ....... 3600875

[51] Int. Cl.$^4$ ............................................. F16H 37/06
[52] U.S. Cl. .................... 74/665 T; 74/674; 180/247
[58] Field of Search ............ 74/13, 15.8, 15.82, 74/15.80, 674, 665 GA, 665 H, 665 T, 665 K, 740; 180/233, 247, 248, 249, 250

[56] References Cited

U.S. PATENT DOCUMENTS

| | | | |
|---|---|---|---|
| 4,369,671 | 1/1983 | Matsumoto et al. | 74/740 X |
| 4,422,349 | 12/1983 | Matsumoto et al. | 180/247 X |
| 4,444,073 | 4/1984 | Moroto et al. | 180/247 X |
| 4,458,557 | 7/1984 | Hayakawa | 74/674 X |
| 4,576,061 | 3/1986 | Yamakawa et al. | 74/665 T |
| 4,582,159 | 4/1986 | Suzuki | 74/740 X |
| 4,586,583 | 5/1986 | Yamakawa et al. | 180/247 |
| 4,679,450 | 7/1987 | Hayakawa et al. | 74/740 |

FOREIGN PATENT DOCUMENTS

| | | | |
|---|---|---|---|
| 3212495 | 10/1983 | Fed. Rep. of Germany . | |
| 56-14649 | 2/1981 | Japan | 74/674 |

Primary Examiner—Leslie A. Braun
Assistant Examiner—Dwight G. Diehl
Attorney, Agent, or Firm—Barnes & Thornburg

[57] ABSTRACT

A planetary transfer transmission for the drive of two vehicle axles of a motor vehicle, whereby a central input shaft, a coaxial central output shaft, and a concentric output shaft, in a torsionally fixed way, are respectively connected with one gear element of a planetary wheel gear that can be locked by a locking multi-disk clutch. An input wheel of an axle offset gear, that can be driven by the concentric output shaft, the planetary wheel transmission, and the locking multi-disk clutch are arranged in line to one another.

The input wheel is disposed on the side of the locking multi-disk clutch that is opposed to the planetary wheel gear and, in a torsionally fixed way, is held on an outer hollow shaft that is rotatably disposed on the concentric output shaft and can be brought into driving connection with the concentric output shaft by an axle-connecting multi-disk clutch that is arranged on the side of the input wheel that is opposed to the locking multi-disk clutch. In this way, the axle offset gear is in a favorable position with respect to the driving engine and the whole drive train to the disconnected driving axle, in the case of a single-axle drive, is separated from the driving engine.

7 Claims, 1 Drawing Sheet

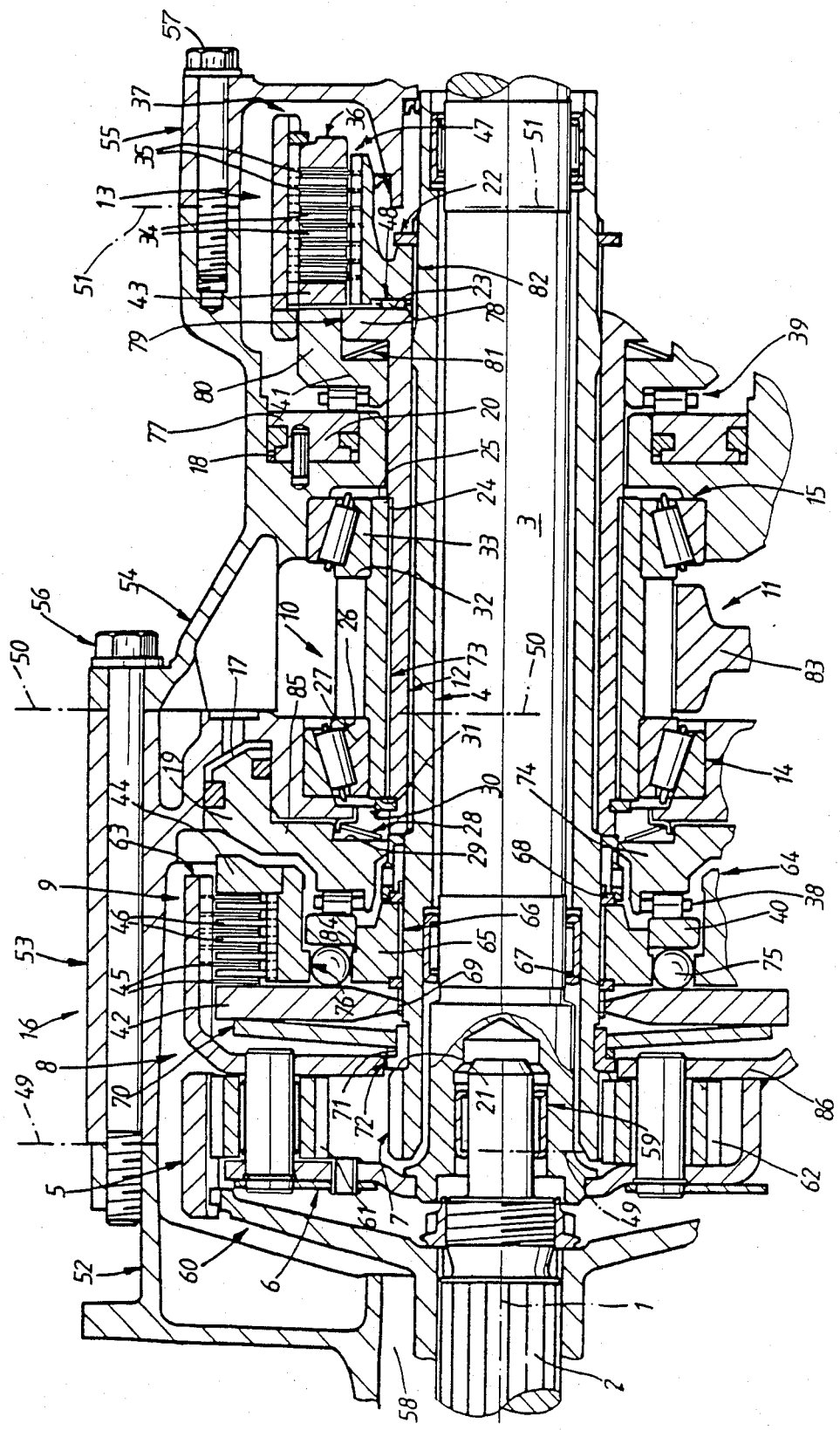

PLANETARY TRANSMISSION FOR TWO AXLES OF A MOTOR VEHICLE

BACKGROUND AND SUMMARY OF THE INVENTION

The invention relates to a planetary wheel transfer transmission for the drive of two vehicle axles of a motor vehicle.

It has been contemplated in German Unexamined Published Patent Application (DE-OS No. 32 12 495) that the planetary gear transmission is disposed axially between the input wheel of the axle offset gear that is penetrated by the input shaft and the locking disk clutch. The input wheel, in a torsionally fixed way, is connected directly with the concentric output shaft leading to an inner central wheel. In this way, the axle offset gear used for driving a power take-off shaft leading to one vehicle axle is located very close to the driving motor or to the speed-change gear flanged onto the driving motor. When the axle offset gear is used in a vehicle type that can be equipped with engines of different sizes, such as 4-cylinder or 6-cylinder in-line engines, a disadvantageous result can attain in unfavorable installing conditions.

Thus, it is an object of the present invention to provide an improved transfer transmission for use in vehicle types that are equipped with engines of different sizes. Another object of the invention is keeping the number of gear parts driven by the engine in the drive train, which is not required for this purpose, as few as possible in the case of the driving of only one vehicle axle.

These and other objects are attained by providing a compact construction that is particularly stout with respect to the main shaft of the gearbox, with a favorable position of the axle offset gear in the direction of the main shaft of the gearbox.

An advantageous introduction is also achieved of the counterbearing forces of the multi-disk clutches into the gearbox, particularly a balance of forces is achieved while, at the same time, pressure is admitted to both axial ring pistons.

The use of axial ring pistons is permitted that "stand vertically" in the gearbox, and that do not have to carry out rotational movements and may, therefore, be sealed off in a particularly effective way. This sealing phenomena has the additional advantage that a central storage means can be used as the pressure source that also supplies other consuming means because of a pump for the compensating of leaks is not required.

When work is carried out on the chassis dynamometer during which the one concerned vehicle axle is disconnected by the axle-connecting multi-disk clutch and is therefore stopped, it is further ensured that no damage will occur from the resulting relative movements between the two multi-disk carriers since these are mutually supported by means of roller bearings.

The advantage is also achieved that, in the case of a single-axle drive, the whole axle offset gear, including the power take-off shaft leading to the disconnected driving axle, are also separated from the engine.

Other objects, advantages and novel features of the present invention will become apparent from the following detailed description of the invention when considered in conjunction with the accompanying drawing.

BRIEF DESCRIPTION OF THE DRAWING

The FIGURE is a part-sectional schematic view showing the planetary gear transfer case device according to the principles of the present invention.

DETAILED DESCRIPTION OF THE DRAWING

As illustrated in the FIGURE, a planetary carrier transfer transmission has a gearbox 16 that, as shown in the three junction planes 49—49, 50—50, and 51—51 parallel to one another and vertical with respect to a axis 1 shaft of the gear box, is divided into four housing parts. The four housing parts include an adapter housing 52, a planetary wheel housing 53, a spur wheel housing 54 and a housing end part 55. While the housings 52, 53 and 54 are braced with respect to one another by means of fastening screws 56, the spur wheel housing 54 and housing end part 55 are flanged onto one another by means of fastening screws 57. An input shaft 2 that is coaxial with respect to the main axis 1 of the gearbox projects into the gearbox 16 via a front faceside housing opening 58 of the adapter housing 52. This input shaft 2 may be formed by the gear output shaft of a speed-changing gear that is shifted by hand and is flanged onto the driving engine of a motor vehicle. The rear end of the input shaft 2 is connected with the outer central wheel 5 of a planetary wheel gear 8 in a torsionally fixed way by means of a driving star 60. The input shaft 2 is supported in the front shaft end by means of a radial needle bearing 59, of an output shaft 3 that is centrally located with respect to the main axis 1 of the gearbox.

The rear shaft end of the output shaft 3, in a way that is not shown, is rotatably supported in the housing end part and is permitted to be in a permanent driving connection in the conventional way with the axle drive of a driving axle of the motor vehicle. The front shaft end of the output shaft 3, in a torsionally fixed way, is connected with a planetary carrier. The outer and inner planets 61 and 62 of the planetary carrier 6 are pivoted to mate with one another. The outer planets 61 mate with the outer central wheel 5. The inner planets 62 are in a mating engagement with an inner central wheel 7. The inner central wheel 7 is unitary with a hollow output shaft 4 that is concentric with respect to the output shaft 3.

The planetary wheel gear 8 can be locked by a locking multi-disk clutch 9 that is included in the planetary wheel housing 53. The outer disks 45 of the locking multi-disk clutch 9, in the conventional way, are held in axial grooves of an outer disk carrier 63 in a torsionally fixed, but axially slidable manner. The outer disk carrier 63 is torsionally fixed with respect to the planetary carrier 6. Inner disks 46 are interposed between the outer disks 45. The inner disks 46 are held in axial grooves of an inner disk carrier 64 in the same way as the outer disks 45 are held in axial grooves of the outer disk carrier in a torsionally fixed but axially slidable manner.

The inner disk carrier 64 is unitary with a radially inner clutch hub 65 that is fixed torsionally by corresponding splines 66, and is fixed axially unslidably on the concentric output shaft 4 of the inner central wheel 7 by securing rings 67 and 68 arranged on the front side of the radially inner clutch hub 65. The set 45, 46 of disks, in the direction of the main axis 1 of the gearbox facing away from the planetary wheel gear 8, rests against a ring-shaped counterbearing 44. The ring-shaped counterbearing 44, at least in the direction of the main axis 1 of the gearbox, is immovably fixed with respect to the inner disk carrier 64. At the end of the set 45, 46 of disks opposite to the counterbearing 44, a ring-shaped pressure plate 42 is arranged that can be supported at the adjacent outer disk 45. The ring-shaped pressure plate 42 is tortionally fixed on the output shaft 4 by splines 69. Thus, pressure plate 42 cannot be rotated with respect to the inner disk carrier 64.

The pressure plate 42, is arranged so that it can be moved with respect to the set 45, 46 of disks in the direction of the main axis 1 of the gearbox and is actuated by means of a disk spring 70 for the engaging of the locking disk clutch 9. The radially inner edge area of the disk spring 70 is axially supportable at a spacer ring 71 that is slidably arranged on an L-shaped axially slotted bearing ring 72. The bearing ring 72 is provided axially between the splines 66 and the inner central wheel of the concentric output shaft 4. The ring bearing 72 is inserted in a circumferential groove of the concentric output shaft 4. The ring bearing 72 supports itself at the adjacent front surface of the central wheel 7. The central wheel 7 is used as the axial pressure bearing 21 under the affect of the disk spring 70.

An input wheel 10 of a spur wheel axle offset gear 11, by means of two tapered roller bearings 14 and 15 arranged in the gearbox 16, is arranged centrally with respect to the main axis 1 of the gearbox. The input wheel 10 is arranged in a torsionally fixed way on an outer hollow shaft 12 by means of corresponding splines 73. The input wheel 10 rotates via the tapered roller bearings 14 and 15. In addition, the input wheel 10, in both directions of the main axis 1 of the gearbox, is immovably fixed with respect to the outer hollow shaft 12. The input wheel 10 is immovably fixed on one side by one front surface of its wheel hub that rests against a retaining ring 30 of the outer hollow shaft 12. The retaining ring 30 is used as an axial pressure bearing used as the axial pressure bearing surface 25, and rests against a projection 24 of the outer hollow shaft 12.

The planetary wheel housing 53 that houses the tapered roller bearing 14 has a centrally located ring-shaped working pressure chamber 17 with an axial ring piston 19 that is unitary with a pressure ring 74 for the actuating of the locking multi-disk clutch 9 in the sense of a disengagement. The pressure chamber 17 is arranged axially between the hub 65 and the tapered roller bearing 14. The pressure ring 74, via an axial roller bearing 38, affects an adjusting ring 40. The adjusting ring 40, via balls 75, actuates the pressure plate 42. While the adjusting ring 40 is centered at a projection of the hub 65, the balls 75 are guided, in an axially movable way, in corresponding axial passages 76 of the hub 65.

The concentric output shaft 4 and the outer hollow shaft 12 can be brought into driving connection by means of an axle-connecting multi-disk clutch 13. The axle-connecting multi-disk clutch 13 is arranged on the side of the input wheel 10 that is opposite the locking multi-disk clutch 9. By means of an axial ring piston 20, that is arranged between the adjacent tapered roller bearing 15 and the axle-connecting multi-disk clutch 13, the axle-connecting multi-disk clutch 13 can be actuated in the sense of an engagement. The axial ring piston 20, that is unitary with a pressure ring 77, operates in a ring-shaped working pressure chamber 18 of the spur wheel housing 54. The axial ring piston 20 is parallel with respect to the main axis 1 of the gearbox. The pressure ring 77, via an axial roller bearing 39, affects an adjusting ring 41 that has axial pressure bolts 80. The pressure bolts 80, in an axially movable way, penetrate the corresponding passages 79 of a radial closing wall 78 of a cylinder-shaped outer disk carrier 37 of the axle-connecting multi-disk clutch 13. The closing wall 78 is connected in one piece with the adjacent shaft end of the outer hollow shaft 12. A disk spring 81 supporting itself between the adjusting ring 41 and the closing wall 78 disengages the axle-connecting mutli-disk clutch 13 when the pressure force of the axial ring piston 20 is switched off.

Outer disks 34 are arranged in axial grooves of the outer disk carrier 37. The outer disks 34 are held, in a conventional way, so that they are torsionally fixed but axially slidable. The inner disks 35 are interposed between the outer disks 34 and held in axial grooves of an inner disk carrier 47. The inner disk carrier 47 is torsionally fixed on the concentric output shaft 4 via corresponding splines 82. The inner disk carrier 47 supports itself via an axial roller bearing 48 at an axial pressure bearing surface 23 of the closing wall 78 in one direction of the main axis 1 of the gearbox. The inner disk carrier 47 supports itself at a retaining ring 22 of the output shaft 4 in the opposite direction of the main axis 1 of the gearbox.

The set 34, 35 of disks of the axle-connecting multi-disk clutch 13 can be supported at a ring-shaped counterbearing 36, which is arranged in a torsionally fixed way at the outer disk carrier 37 and immovably fixed in the direction of the main axis 1 of the gearbox pointing away from the adjusting ring 41. At the opposite end of the set 34, 35 of disks, a ring-shaped pressure plate 43 is provided that, in a torsionally fixed, but axially slidable way, is arranged at the outer disk carrier 37.

When working pressure is admitted to the axial ring piston 20 and the clutch is engaged, the pressure bolts 80 affect the pressure plate 43. This allows for the counterbearing forces of the counterbearing 36, via the outer disk carrier 37, via the closing wall 78, and via the retaining ring 30 of the outer hollow shaft 12, to be transferred to the hub of the input wheel 10. The flux of force extends from the hub of the input wheel 10 into the gearbox 16 via the front surface 32 and the contacting inner ball race 33 of the tapered ball bearing 15 adjacent to the axle-connecting multi-disk clutch 13.

In the case of the locking multi-disk clutch 9, the engaging forces of the disk spring 70 and the corresponding counterbearing forces at the counterbearing 44 are absorbed by the axial pressure bearing surface 21 and the retaining ring 68 at the concentric output shaft 4 and thus, no forces occur toward the outside of the locking multi-disk clutch 9. The counterbearing force resulting from the admission of pressure to the axial ring piston 19 when the locking disk clutch 9 is disengaged is absorbed either by the axial pressure bearing surface 21 alone or, in addition, also by the retaining ring 67 and introduced into the concentric output shaft 4. From the concentric output shaft 4, the flow of force then extends via the retaining ring 22, the inner disk carrier 47 and the axial roller bearing 48, into the outer hollow shaft 12. The outer hollow shaft 12, in this case, via its projection 24, supports itself at the wheel hub of the input wheel 10 which introduces the counterbearing force with its other front surface 26, to the inner ball race 27 and thus, into the gearbox 16 via the tapered roller bearing 14 adjacent to the locking disk clutch 9.

In a corresponding manner similar to the affect that the disk spring 81 causes with respect to the axial roller bearing 39, a disk spring 28 that supports itself between the planetary wheel housing 53 and a front surface 29 of the pressure ring 74 also keeps the axial roller bearing 38 free of play when the corresponding axial ring piston 19 is relieved from pressure.

The input wheel 10, via at least one intermediate wheel 83 in a way that is not shown, is in driving connection with the output wheel of the axle offset gear 11. The axle offset gear 11 is coupled with a power take-off shaft leading to the axle drive of the second vehicle axle.

The tapered roller bearing 14 and the axial ring piston 19 are arranged concentrically with respect to one another in such a way that the front surface 26 of the roller bearing 14, limiting the toothing of the input wheel 10, coincides almost approximately with the junction plane 50—50. Therefore, the position of this junction plane in the direction of the main axis 1 of the gearbox is also characteristic of the respective position of the axle offset gear 11, namely in such a way that the axle offset gear 11 has a favorable distance to the driving engine (in the direction of the junction plane 49—49 of the adapter housing 52).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A planetary wheel transfer transmission for the drive of two vehicle axles of a motor vehicle having an input shaft that can be driven by a driving machine and is central with respect to a main axis of a gearbox, a coaxial central output shaft, and a concentric output shaft, that is concentric with respect to one of the input shaft and the central output shaft connected in a torsionally stable way with one transmission element respectively of a planetary wheel gear having a locking multi-disk clutch connecting two of the planetary wheel gear elements with one another, and having an input wheel of an axle offset gear that can be driven by the concentric output shaft, and where the planetary wheel gear and the locking multi-disk clutch are located in line with respect to one another along the main axis of the gearbox, the improvement comprising:

a concentric outer hollow shaft rotatable on the concentric output shaft;

an input wheel means disposed on the side of the locking multi-disk clutch that is opposite the planetary wheel gear and held in a torsionally fixed way on the concentric outer hollow shaft;

an axle-connecting multi-disk clutch arranged on the side of the input wheel means that is opposite the locking multi-disk clutch for bringing the concentric outer hollow shaft into driving connection with the concentric output shaft, each end of said input wheel means being supported in a transmission housing by a respective bearing means, and a ring-shaped working pressure chamber means with a respective axial ring position means arranged centrally to the main axis of the gearbox at each end of said input wheel means and axially between a respective bearing means and the adjacent multi-disk clutches so that the axial ring position are actuated in the direction away from the input wheel means along the main shaft axis of the gearbox.

2. A planetary wheel transfer transmission according to claim 1, wherein the counterbearing forces of the multi-disk clutches are introduced into the transmission housing via the respective bearing means adjacent to the respective axial ring piston means by axial pressure bearing means.

3. A planetary wheel transfer transmission according to claim 2 wherein the axial pressure bearing means support the concentric output shaft relative to the outer hollow shaft along the main shaft axis of the transmission.

4. A planetary wheel transmission according to claim 1, wherein the outer hollow shaft and a first counterbearing supporting a set of disks of the axle-connecting multi-disk clutch are connected with an outer disk carrier.

5. A planetary wheel transfer transmission according to claim 1, wherein the axial ring piston means via axial roller bearings respectively are supported at one adjusting ring means that respectively affects pressure plates.

6. A planetary wheel transfer transmission according to claim 5, wherein the pressure plates are arranged at the end of the respective sets of disks that are opposite the respective counterbearings.

7. A planetary wheel transfer transmission according to claim 1, wherein two disk carries of the axle-connecting multi-disk clutch are mutually supported by an axial roller bearing.

* * * * *